Feb. 7, 1961 C. K. STROBEL ET AL 2,971,074
TEMPERATURE RESPONSIVE CONTROL
Filed May 9, 1958

United States Patent Office 2,971,074
Patented Feb. 7, 1961

2,971,074

TEMPERATURE RESPONSIVE CONTROL

Charles K. Strobel, Pittsburgh, and Richard T. Kimmell, Hunker, Pa., assignors to Robertshaw-Fulton Controls Company, Richmond, Va., a corporation of Delaware Filed May 9, 1958, Ser. No. 734,174

10 Claims. (Cl. 219—20)

This invention relates generally to an improved control mechanism for controlling the heat output of a heating element and more particularly to an electric thermostatic control system for controlling a surface heating element of an electric range.

In the operation of electric ranges, it is desirable in many cases to rapidly heat foods up to a predetermined temperature and thereafter maintain such predetermined temperature. It is the principal object of this invention to automatically control the heat output of a surface heating element to effect such a cooking operation on a cooking vessel heated by a surface heating element.

Another object of this invention is to employ a temperature sensitive resistance sensing element in an electrical circuit for controlling the heat output of a surface heating element.

Another object of this invention is to insure accurate ambient temperature compensation in a device of the above type.

Another object of this invention is to design an electrical control circuit of the above type which will compensate for changes in supply voltage.

In a preferred embodiment of the invention, the temperature responsive control includes a power relay adapted to control a switch serially connected in the supply circuit to the heating element. The power relay circuit is controlled by a heat responsive switch mechanism comprised of a pair of heat responsive bimetals mounted parallel to each other and being constructed so as to move in the same sense in response to ambient temperature changes. Electrical contacts are mounted on the bimetals and are serially connected in the power relay circuit. A primary control circuit, which includes a sensing element responsive to the temperature of the cooking vessel and a heater for supplying heat to one of the bimetals in accordance with the temperature sensed by the sensing element, is provided for actuating the switching mechanism between an open and a closed position to thereby open and close the supply circuit to the heating element. A second control circuit is employed for positioning the other bimetal with respect to the first mentioned bimetal to thereby predetermine the point at which the contacts will separate as the first bimetal moves in response to the heat supplied thereto as by the heater of the primary control circuit. This second control circuit includes a heater adapted to supply heat to the second bimetal for positioning the same.

The above and other objects and features of the invention will appear more fully hereinafter from a consideration of the following description taken in connection with the accompanying drawing wherein.

Figure 1:
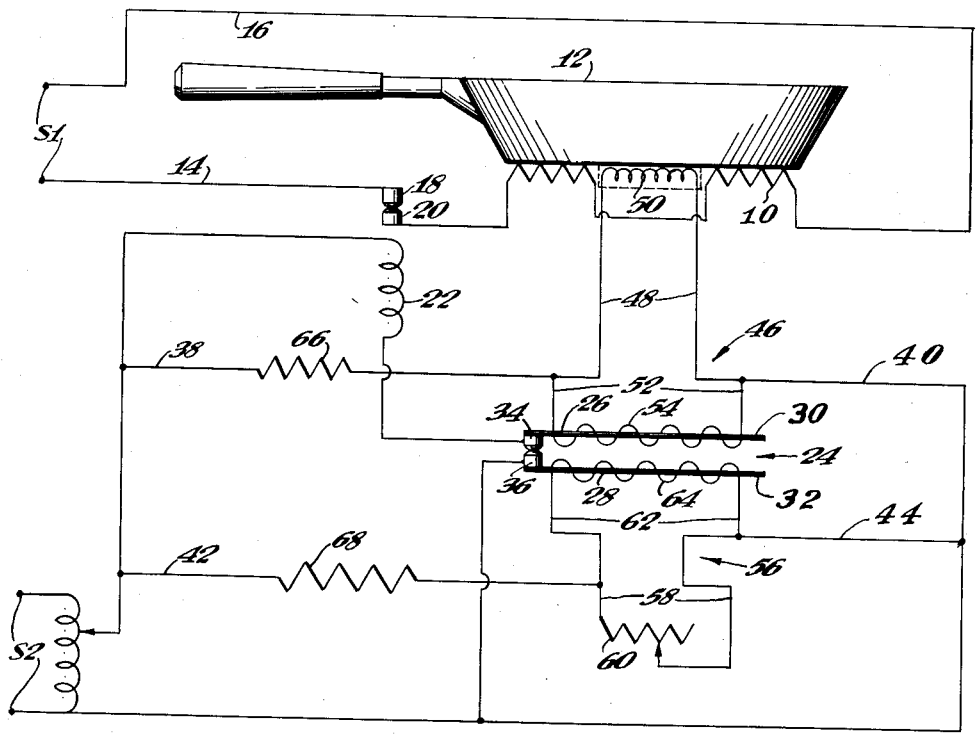
Fig. 1 is a schematic showing of a preferred embodiment of the invention.

Referring now to Fig. 1, the heating assembly illustrated therein includes a heating element 10 adapted to heat a cooking vessel 12 which is adapted to be supported in heating proximity thereto. A supply circuit comprising leads 14 and 16 connects the heating element 10 to a supply of electrical energy S1. A switch means consisting of a pair of power relay contacts 18 and 20 is serially connected in lead 14.

A power relay circuit is provided for actuating power relay contacts 18 and 20 between open and closed positions to thereby control the power supply to heating element 10. The power relay circuit includes a power relay 22 connected in series with a switching mechanism 24 for making and breaking the circuit and is connected to a source of electrical energy S2. Power relay 22 may be of the magnetic or heat motor type and is adapted to open power relay contacts 18 and 20 when the power relay circuit is broken and to close the same when the power relay circuit is completed under the action of switching mechanism 24.

Switching mechanism 24 comprises a pair of heat responsive bimetallic strips 26 and 28 mounted in spaced parallel relation to each other. Bimetal strips 26 and 28 are similarly constructed and are arranged so as to bend in the same sense in response to ambient temperature changes. In this manner compensation for ambient temperature changes is assured. Bimetal strips 26 and 28 are rigidly secured at oppositely disposed ends 30 and 32, respectively, for bending movement thereabout. A pair of electrical contacts 34 and 36 are mounted in opposed relation on the freely movable ends of bimetallic strips 26 and 28, respectively. Electrical contacts 34 and 36 are serially connected in the power relay circuit and are movable into and out of engagement for making and breaking such circuit. Bimetallic strips 26 and 28 are biased so that contacts 34 and 36 are normally in engagement and are constructed so that upon an increase in the temperature thereof, bimetallic strip 26 will move away from bimetallic strip 28 and bimetallic strip 28 will move toward bimetallic strip 26.

Circuit means are provided for actuating switching mechanism 24 between the circuit making and circuit breaking positions thereof in response to predetermined cooking vessel temperature conditions. Such means comprises a primary control circuit for controlling the movement of bimetallic strip 26 toward and away from bimetallic strip 28 in response to the temperature condition in cooking vessel 12 and a secondary control circuit for adjusting the position of bimetallic strip 28 with respect to bimetallic strip 26 to thereby vary the separation point of contacts 34 and 36. These control circuits are connected in parallel relation with the primary control circuit being connected to electrical source S2 through leads 38 and 40 and the secondary control circuit being connected to electrical source S2 through leads 42 and 44.

The primary control circuit includes a parallel mesh 46 connected between leads 38 and 40 and having one branch 48 connected to a temperature sensitive resistance sensing element 50 of the type in which the resistance increases with an increase in the sensing element temperature and the other branch 52 connected to a resistance heater 54. Sensing element 50 is mounted so as to have good thermal response to the temperature prevailing at the bottom of cooking vessel 12. Heater 54 forms a winding around bimetallic strip 26 and is electrically insulated therefrom by suitable insulating tape wrapped around the bimetallic strip 26.

The secondary control circuit includes a parallel mesh 56 connected between leads 42 and 44 and having one branch 58 connected to an adjustable resistance 60 made of wire similar to that used in sensing element 50 and another branch 62 connected to a resistance heater 64. Heater 64 forms a winding around bimetallic strip 28 and is electrically insulated therefrom by suitable insulating tape wrapped around bimetallic strip 28. Adjustable resistance 60 serves as a means for setting the control system for different control temperatures as will be hereinafter described.

Parallel mesh 46 is connected in series with a resistance 66 in lead 38 and parallel mesh 56 is connected in series with a resistance 68 in lead 42. The values of resistances 66 and 68 are chosen so as to give the primary and secondary control circuits similar electrical properties and since these circuits are connected to electrical source S2 in the same manner, they will compensate for changes in the supply voltage. The control system constants are chosen so that the current flow will not heat sensing element 50 to a temperature higher than the lowest control temperature desired.

In operation, a cooking vessel at room temperature is supported in heating proximity to heating element 10, adjustable resistance 60 is moved to desired control temperature setting and the various circuits are connected to their respective sources of electrical energy. At this initial stage, the switching mechanism 24 is maintained in its normally closed position as there is very little heat being supplied to the bimetal strips 26 and 28. Switching mechanism 24 will thus complete the power relay circuit whereby power relay 22 will maintain power relay contacts 18 and 20 in the closed position thereof to thereby connect the heating element 10 to electrical source S1.

Heating element 10 will thus become heated thereby increasing the cooking vessel temperature which in turn increases the temperature of sensing element 50. As the temperature of sensing element 50 increases, there will be a corresponding increase in the resistance thereof which will decrease the current through branch 48 of parallel mesh 46 causing an increase in voltage across parallel mesh 46 and an increase in current through heater 54. Heater 54 then supplies an increased heat output to bimetal 26 causing the same to bend away from bimetal 28.

When the cooking vessel 12 reaches the control temperature, bimetal strip 26 will just cause contact 34 to move out of engagement with contact 36 thereby breaking the power relay circuit. This will de-energize the power relay 22 so that power relay contacts 18 and 20 will open to thereby de-energize heating element 10. When the cooking vessel temperature subsequently drops below the desired control temperature, heater 54 will actuate bimetal strip 26 to close power relay contacts 34 and 36 to cause energization of heating element 10 as described above. The control system will cycle as described above to maintain the cooking vessel at the control temperature. It will thus be apparent that the control system will cause heating element 10 to rapidly heat the cooking vessel 12 up to the desired control temperature and thereafter maintain such temperature.

The control system may be set for different control temperatures by varying the setting of adjustable resistance 60. It will be apparent that an increase in adjustable resistance 60 will increase the current through heater 64. This will cause an increase in the supply of heat to bimetal strip 28 to cause the same to bend toward bimetal strip 26. Hence, it will be necessary for bimetal strip 26 to bend a greater distance away from the normal position thereof before power relay contacts 34 and 36 will be opened. Since the amount of bending of bimetal strip 26 is ultimately determined by the temperature of the cooking vessel 12 which determines the resistance of sensing element 50 and hence the current through heater 54, it will be apparent that the setting of adjustable resistance 60, which determines the position of bimetal 28, will determine the cooking vessel temperature at which power relay contacts 34 and 36 are opened to thereby de-energize heating element 10. Hence, the setting or adjustable resistance 60 will determine the control temperature.

Figure 2:
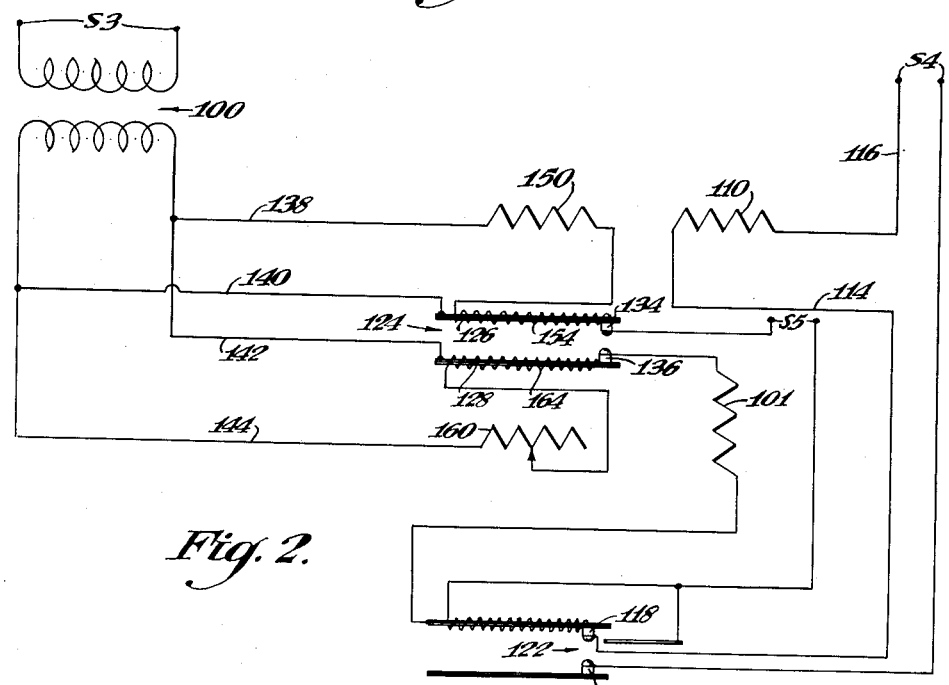
Fig. 2 is a schematic showing of a modified embodiment of the invention.

Referring now to Fig. 2, the modified control system illustrated therein is similar to the Fig. 1 embodiment except that the invention is illustrated in a series arrangement wherein the primary and secondary control circuits are connected to an electrical source S3 through a transformer 100 which steps-down the supply voltage to a low value of approximately 4 volts. An advantage of using the step-down transformer is that the sensing element resistance may be made low whereby a small and simple sensing element design may be employed.

A supply circuit, comprising leads 114 and 116, connects a heating element 110 to a source of electrical energy S4 through a pair of power relay contacts 118, 120, serially connected in lead 114. A power relay circuit is provided for actuating contacts 118 and 120 between the open and closed positions and includes a heat motor power relay 122 connected in series with a resistance 101, a switching mechanism 124 for making and breaking the circuit, and a source of electrical energy S5. The heat motor power relay 122 is adapted to open power relay contacts 118 and 120 when the power relay circuit is open and close the same when the power relay circuit is closed.

Switching mechanism 124 comprises a pair of heat responsive bimetallic strips 126 and 128 constructed and arranged in a manner similar to the bimetallic strips 26 and 28 described above with respect to Fig. 1. A pair of electrical contacts 134 and 136 are mounted in opposed relation on the freely movable ends of bimetallic strips 126 and 128, respectively. Electrical contacts 134 and 136 are serially connected in the power relay circuit and are movable into and out of engagement on movement of the bimetals 126 and 128 for making and breaking the power relay circuit. Bimetallic strips 126 and 128 are normally biased into engagement and are constructed so that upon an increase in the heat supply thereto, they will move in the same sense with bimetal 126 moving toward bimetal 128 and bimetal 128 moving away from bimetal 126.

Circuit means are provided for actuating switching mechanism 124 between the circuit making and circuit breaking positions thereof in response to cooking vessel temperature changes. Such means comprises a primary control circuit for controlling the movement of bimetallic strip 126 toward and away from bimetallic strip 128 in response to the cooking vessel temperature condition and a secondary control circuit for adjusting the position of bimetallic strip 128 with respect to bimetallic strip 126 to thereby vary the separation point of contacts 134 and 136. These control circuits are connected in parallel, the primary control circuit being connected to an electrical source S3 through leads 138 and 140 and the secondary control circuit being connected to electrical source S3 through leads 142 and 144.

The primary control circuit includes a temperature sensitive resistance sensing element 150 connected in series with a resistance heater 154 and bimetallic strip 126. Sensing element 150 is mounted for good thermal contact with the cooking vessel. Heater 154 is wound around an electrically insulated portion of bimetallic strip 126 and is connected to a conducting portion thereof.

The secondary control circuit includes an adjustable resistance 160 connected in series with a resistance heater 164 and bimetallic strip 128. Resistance heater 164 is wound around an electrically insulated portion of bimetallic strip 128 and is connected to a conducting portion thereof. It will be apparent that adjustable resistance 160 serves as a means for setting the control system for different control temperatures in the same manner as adjustable resistance 60 of the Fig. 1 embodiment.

The adjustment and operation of the series control system of the Fig. 2 embodiment is substantially the same as the Fig. 1 embodiment. The only essential difference is that in the series system an increase in the cooking vessel temperature results in a decrease in the amount of heat supplied to the primary control circuit bimetal 126 whereas the opposite result occurs in the series-parallel control system of Fig. 1. Such a result is obtained in the Fig. 2 embodiment because an increase in the resistance of the sensing element 150 caused by an increase of the cooking vessel temperature will result in a decrease in current through heater 154 and a decrease in the amount of heat being supplied to bimetallic strip 126. As the temperature of bimetallic strip 126 drops, it will tend to move away from bimetallic strip 128 until the control temperature is reached whereupon bimetallic strip 126 will just cause contact 134 to move out of engagement with contact 136 thereby breaking the power relay circuit. This will de-energize the power relay 122 so that power relay contacts 118 and 120 will open to thereby de-energize the element 110.

It is to be understood that although several embodiments of this invention have been shown and described, the invention can be variously embodied and changes may be made in the construction and arrangement of parts without departing from the scope of the invention as defined in the appended claims.

We claim:

1. A control system for an electric heating element adapted to heat a cooking vessel supported in heating proximity thereto comprising first circuit means connecting the heating element to a source of electric energy and including a switch means operable between an open and a closed position for controlling the energization of the heating element, second circuit means operatively associated with said switch means for actuating the same between said open and closed positions, said second circuit means including a switching mechanism operable between a pair of controlling positions for controlling the actuation of said switch means by said second circuit means, said switching mechanism including a pair of heat responsive bimetals and being movable in the same sense in response to ambient temperature changes, a pair of oppositely disposed contacts, one of said contacts being mounted on one of said pair of bimetals, the other of said contacts being mounted on the other of said pair of bimetals, said contacts being movable into and out of engagement in response to movement of said bimetals and being serially connected in said second circuit means, and third circuit means operatively associated with said switching mechanism for operating the same between said pair of controlling positions, said third circuit means including a first circuit portion having an electric resistance sensing element adapted to be responsive to the temperature of the cooking vessel and means for heating said one of said pair of bimetals and a second circuit portion connected in parallel with said first circuit portion and having an adjustable resistance means and a means for constantly heating said other of said pair of bimetals to maintain the same in a predetermined position, said first circuit portion being operable in response to a predetermined cooking vessel temperature to actuate said switching mechanism to one of said pair of controlling positions and said second circuit portion being operable to adjust said predetermined temperature.

2. A control system as claimed in claim 1 wherein said electric resistance sensing element and said heating means for said one of said pair of bimetals are electrically connected in a first parallel mesh and said adjustable resistance means and said heating means for said other of said pair of bimetals are electrically connected in a second parallel mesh.

3. A control system as claimed in claim 1 wherein said first circuit portion and said second circuit portion have resistance means for compensating for supply voltage changes.

4. A control system as claimed in claim 1 wherein said electric sensing element is connected in series with said heating means for said one of said pair of bimetals and said adjustable resistance means is connected in series with said heating means for said other of said pair of bimetals.

5. A control system as claimed in claim 4 wherein said second circuit means includes a heat motor power relay for actuating said switch means between said open and closed positions, said power relay being connected in series with said contacts.

6. A control system for an electric heating element adapted to heat a cooking vessel supported in heating proximity thereto comprising a first circuit means connecting the heating element to a source of electric energy and including a switch means operable between an open and a closed position for controlling the energization of the heating element, second circuit means operatively associated with said switch means for actuating the same between said open and closed positions, said second circuit means including a heat responsive switching mechanism operable between a first controlling position in which said second circuit means is operable to actuate said second switch means to said open position and a second controlling position in which said second circuit means is operable to actuate said switch means to said closed position, third circuit means having a heating means operably associated with said heat responsive switching mechanism for actuating said switching mechanism between said controlling positions, and means adapted to be responsive to the temperature of the cooking vessel for controlling the heat output of said heating means, and fourth circuit means having a second heating means operably associated with said heat responsive switching mechanism for controlling the amount of heat output by said first heating means required for actuating said switching mechanism to said first controlling position and means for adjusting the heat output of said second heating means, said second heating means being electrically connected to supply a steady amount of heat to said heat responsive switching mechanism 7. In a control system for an electric heating element adapted to heat a cooking vessel, the combination comprising a first circuit means connected to a source of electric energy for energization of the heating element and including a control switch operable between open and closed positions for controlling the energization of said first circuit means, said control switch including a pair of switch members movable in accordance with the amount of heat supplied thereto, and a heating circuit means connected to a source of electric energy for energization independently of said control switch and including a first heating means operatively associated with said control switch for constantly supplying heat at a predetermined rate to one of said switch members to maintain the same in a predetermined position and a second heating means operatively associated with said control switch for supplying heat to the other of said switch members, said second heating means including means responsive to the temperature of the cooking vessel for causing operation of said control switch in accordance with the temperature of the cooking vessel.

8. A control system as claimed in claim 1 wherein said heating circuit means includes means for regulating said predetermined rate at which heat is supplied by said first heating means.

9. A control system for an electric heating element adapted to heat a cooking vessel comprising a first circuit connected to a source of electric energy for energization of the electric heating element including a switch means for controlling energization of the heating element; a second circuit operatively associated with said switch means for actuating same including a control switch having a pair of switch contacts operable between open and closed positions, each of said switch contacts being carried by a separate switch member movable in accordance with the amount of heat applied thereto; a third circuit connected to a source of electric energy independently of said switch contacts for heating one of said switch members at a predetermined rate to maintain the same in a predetermined position including means for setting said predetermined rate to thus determine the amount of heat needed to be supplied to said other switch member to operate said switch contacts between open and closed positions; and a fourth circuit connected to a source of electric energy independently of said switch contacts for heating the other of said switch members including means responsive to the cooking temperature of the cooking vessel for varying the rate at which heat is supplied to said other switch member to cause said other switch member to be positioned in accordance with the temperature of the cooking vessel.

10. A control system for an electric heating element adapted to heat a cooking vessel comprising a first circuit connected to a source of electric energy for energization of the heating element including a switch means for controlling energization of the heating element; a second circuit operatively associated with said switch means for actuating the same including a control switch having a pair of switch contacts operable between open and closed positions, each of said switch contacts being carried by a separate switch member movable in accordance with the amount of heat applied thereto and in the same direction in response to ambient temperature changes; a third circuit connected to a source of electric energy independently of said switch contacts for heating one of said switch members at a predetermined rate to maintain the same in a predetermined position including means for setting said predetermined rate to thus determine the amount of heat needed to be supplied to said other switch member to operate said switch contacts between open and closed positions; and a fourth circuit connected to a source of electric energy independently of said switch contacts for heating the other of said switch members including means responsive to the cooking temperature of the cooking vessel for varying the rate at which heat is supplied to said other switch member to cause said switch member to be positioned in accordance with the temperature of the cooking vessel.

References Cited in the file of this patent

UNITED STATES PATENTS

| | | |
|---|---|---|
| 2,499,906 | Crise | Mar. 7, 1950 |
| 2,510,040 | Rudahl | May 30, 1950 |
| 2,727,973 | Collins | Dec. 20, 1955 |
| 2,815,428 | Pearce | Dec. 3, 1957 |
| 2,819,371 | Aldrich et al. | Jan. 7, 1958 |
| 2,846,556 | Whinery | Aug. 5, 1958 |
| 2,910,569 | Boddy | Oct. 27, 1959 |